April 23, 1963 G. L. RICHARDS 3,087,071

TRANSISTOR-MAGNETIC CORE PULSE OPERATED COUNTER

Filed June 22, 1959 2 Sheets-Sheet 1

INVENTOR.
GLENN L. RICHARDS

BY F. H. Henson

ATTORNEY

April 23, 1963 G. L. RICHARDS 3,087,071

TRANSISTOR-MAGNETIC CORE PULSE OPERATED COUNTER

Filed June 22, 1959 2 Sheets-Sheet 2

United States Patent Office 3,087,071

Patented Apr. 23, 1963

3,087,071

TRANSISTOR-MAGNETIC CORE PULSE OPERATED COUNTER

Glenn L. Richards, Rochester, N.Y., assignor to General Dynamics Corporation, Rochester, N.Y., a corporation of Delaware Filed June 22, 1959, Ser. No. 821,994
7 Claims. (Cl. 307—88)

This invention relates in general to data processing systems and, more particularly, to pulse operated counters for use in such systems.

It is desirable to provide non-volatile, temporary storage in data processing systems to minimize power drain and to minimize the risk of loss of information due to momentary power failures. Magnetic core memory devices meet these basic requirements but temporary storage or pulse operated counter circuits, such as binary dividers, flip-flops, ring counters, encoder-decoders, and shift registers, comprising magnetic core memory devices alone are complex in design and the pulse power required for shifting information from one stage to the next is often a considerable amount.

Accordingly, it is the general object of this invention to provide new and improved pulse operated counter circuits for use in data processing systems.

It is a more particular object of this invention to provide new and improved pulse operated counter circuits utilizing magnetic core devices as the principal elements thereof but which require a minimum of pulse power for shifting information from one stage to another, and which are extremely reliable in operation.

The present invention accomplishes the above cited objects by providing a pulse operated counter in which each stage comprises a magnetic core and a transistor. The magnetic core in each stage, including the first stage when the counter comprises only two stages and is used as a binary divider or a flip-flop or when the counter stages are connected in a closed ring, has five windings thereon. The fifth winding on the core in each stage is connected in series with the first winding of the core in the next preceding stage in the base circuit of the transistor in the next preceding stage, the third winding on the core in each stage is connected in series wiht the second winding on the core in the next preceding stage in the collector circuit of the transistor in the next preeding stage, and trigger pulses are applied to the fourth windings on said cores. Depending upon the application of the counter, the counter is initially operated to the condition in which at least one of the cores is saturated in its first stable direction of saturation and the remaining cores of the counter are saturated in their second stable direction of saturation. The fourth windings on said cores are so poled that each trigger pulse triggers the core or cores which are saturated in said first direction toward saturation in said second direction. The first winding on the core in each stage is poled so as to bias the base and emitter of the transistor in that stage in the forward direction to render the transistor conductive when that core is triggered toward saturation in the second direction, the second winding on the core in each stage is poled so as to aid in driving that core toward saturation in the second direction when the transistor in that stage becomes conductive, the third winding on the core in each stage is poled so as to drive that core toward saturation in the first direction when the transistor in the next preceding stage becomes conductive, and the fifth winding on the core in each stage is poled so as to bias the base and emitter of the transistor in the next preceding stage in the forward direction as that core is driven toward saturation in the first direction. Thus, the collector and base of the transistor in each stage are regeneratively coupled while the core in that stage is being driven toward saturation in the second direction and while the core in the next succeeding stage is being driven toward saturation in the first direction. Since the transistor in each stage provides the switching power required and is held conductive until such time as the core in that stage is reset and the core in the next succeeding stage is set, a relatively minute amount of pulse power is required to initiate the shifting of information from stage to stage and the circuit is extremely reliable in operation.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise six figures on two sheets.

Figure 1:
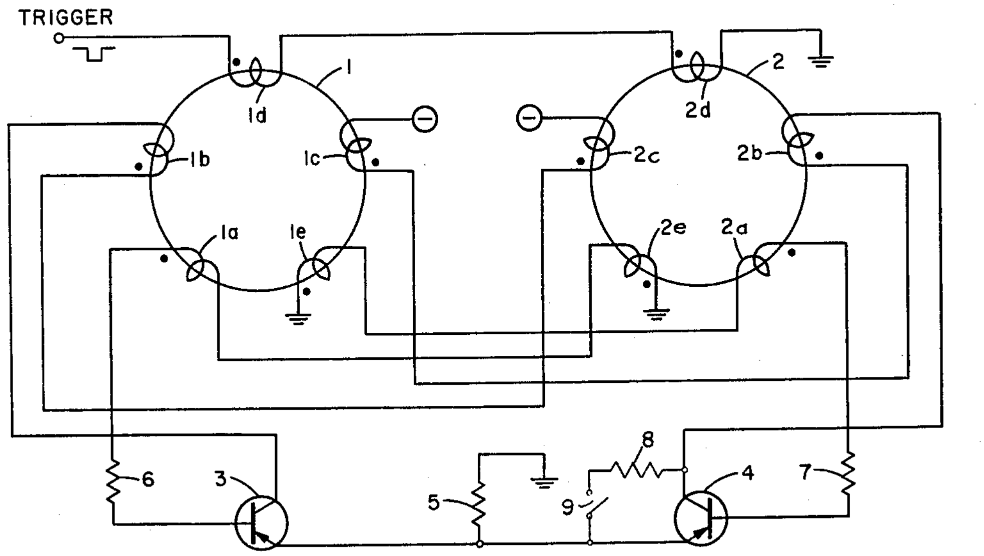
FIG. 1 is a schematic diagram of a binary divider.

The binary divider embodiment of the invention, which is shown in FIG. 1, comprises cross-coupled magnetic cores 1 and 2 and transistors 3 and 4. As shown, the emitter electrodes of transistors 3 and 4 are returned to ground potential through resistor 5, the base of transistor 3 is returned to ground potential through resistor 6, winding 1*a* on core 1 and winding 2*e* on core 2, and the base of transistor 4 is returned to ground potential through resistor 7, winding 2*a* on core 2 and winding 1*e* on core 1. The collector of transistor 3 is returned to negative potential through winding 1*b* on core 1 and winding 2*c* on core 2, while the collector of transistor 4 is returned to negative potential through winding 2*b* on core 2 and winding 1*c* on core 1. Negative-going trigger pulses are applied to series connected windings 1*d* and 2*d* through a switch, or by any other suitable pulse source which has a high impedance during the time that the pulse is not being applied.

Figure 2:
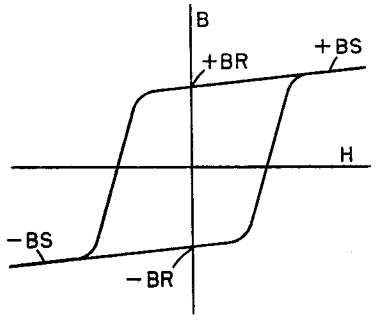
FIG. 2 is a graphic representation of an idealized hysteresis loop for the cores of FIG. 1.

To illustrate the operation of the circuit, assume that core 1 is saturated in the first direction of saturation, as illustrated by the positive point of remanence +BR in FIG. 2, and that core 2 is saturated in the second direction of saturation, as illustrated by the negative point of remanence —BR in FIG. 2. When the circuit is first placed in operation, the above described condition may be obtained by applying a pulse of proper polarity to an input winding (not shown) on core 2 or by momentarily shorting the emitter and collector of transistor 4 through a resistor 8 by means of switch 9. When a negative-going pulse is applied to trigger windings 1*d* and 2*d*, core 1 is triggered from its point of positive remanence +BR toward negative saturation point —BS, while core 2 is driven from negative point of remanence —BR toward negative saturation point —BS. Under these conditions, a relatively large valued negative pulse appears at the dot marked terminals of windings 1*a*, 1*b*, 1*c* and 1*e*, while virtually no voltage is induced in the windings 2*a*, 2*b*, 2*c* and 2*e*. Since the dot marked terminal of winding 1*a* goes negative, as explained above, the base emitter junction of transistor 3 is biased in the forward direction and transistor 3 becomes conductive. As shown, collector circuit windings 1*b* and 2*c* are so poled that when transistor 3 becomes conductive, the terminal of winding 1*b* not marked with a dot, and the dot marked terminal of winding 2c become more positive, core 1 is driven toward negative saturation point —BS and core 2 is driven toward positive saturation point +BS. The flux change generated in core 2 by winding 2c induces a voltage in winding 2e which is in a direction to make the terminal not marked with a dot more negative and thus hold transistor 3 conductive. Thus, the collector and base of transistor 3 are regeneratively coupled until such time as cores 1 and 2 reach hysteresis loop points —BS and +BS, respectively. It is to be noted that under these conditions, the dot marked terminal of winding 2a becomes more positive and transistor 4 is positively biased for non-conduction.

When cores 1 and 2 are saturated in the negative and positive directions, respectively, transistor 3 becomes nonconductive and cores 1 and 2 return to their negative and positive points of remanence —BR and +BR, respectively. The next occurring trigger pulse, of course, triggers core 2 toward saturation in the negative direction and transistor 4 is rendered conductive. The collector and base of transistor 4 are regeneratively coupled until such time as core 2 is driven to negative saturation and core 1 is driven to positive saturation in the exact same manner as described above. Loads may be driven by collector current, collector voltage, base voltage or emitter current.

Figure 3:
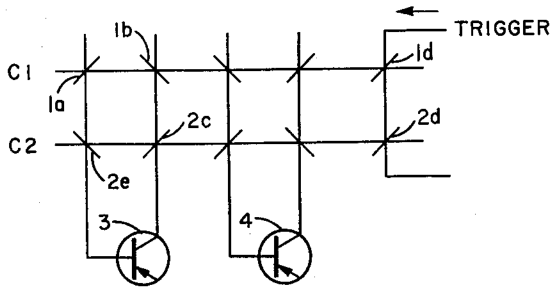
FIG. 3 is a mirror notation representation of the circuit of FIG. 1.

For the purpose of explaining the mirror system of notation, the binary divider circuit of FIG. 1 is shown in mirror notation in FIG. 3. Cores 1 and 2 are represented by the upper and lower horizontal lines, respectively, and the windings on said cores are represented by the diagonal lines intersecting said horizontal lines. In the mirror system of notation, the cores are considered as bar magnets and the direction of reflection of the diagonal lines corresponds to the direction of the resulting flux in the cores. To illustrate the above, the trigger pulse which produces current in the direction shown by the arrow is reflected to the left in cores 1 and 2 and tends to drive both cores toward saturation in one direction. It can be seen that the sense of windings 1a and 1b is such that the collector and base of transistor 3 are regeneratively coupled when core 1 is triggered toward saturation in said one direction, winding 2c is so poled that the direction of flux in core 2 is to the right and thus opposite to that in core 1 when transistor 3 becomes conductive, and that winding 2e is so poled with respect to winding 2c that the collector and base of transistor 3 are regeneratively coupled when the direction of flux in core 2 is to the right.

Figure 4:
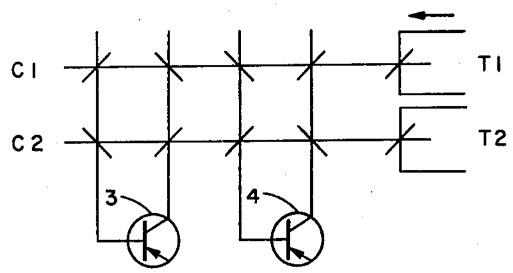
FIG. 4 is a mirror notation representation of a flip-flop circuit.

By the utilization of separate trigger inputs to the trigger windings 1d and 2d of the circuit of FIGS. 1 and 3, the circuit may be operated as a dynamic or pulse type of flip-flop, as shown in FIG. 4. If trigger input T1 is pulsed once, causing transistor 3 to conduct and the cores to change their magnetic states, subsequently applied trigger pulses of the same polarity will produce no flux changes in core C1 and thus no collector current in either transistor 3 or transistor 4. On the other hand, if a pulse of the same polarity is then applied to trigger input T2, transistor 4 becomes conductive and the cores again reverse their magnetic states. Thus, the circuit of FIG. 4 is alternated between the condition in which core 1 is saturated in one direction and core 2 is saturated in the other direction and the condition in which core 2 is saturated in one direction and core 1 is saturated in the other direction by the alternate application of trigger pulses to trigger input windings T1 and T2.

Figure 5:
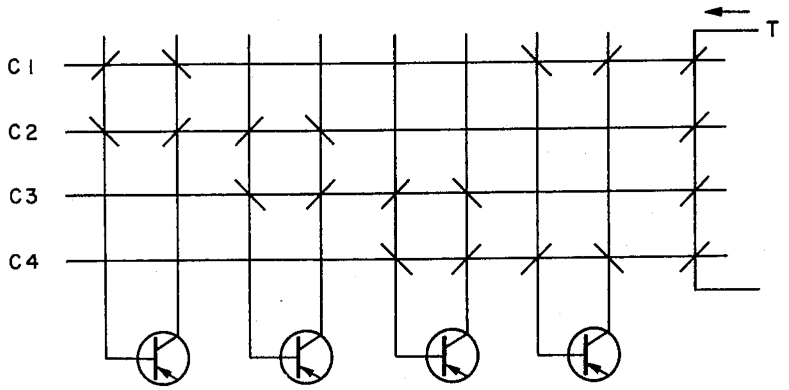
FIG. 5 is a mirror notation representation of a ring counter circuit.

In FIG. 5 the invention has been illustrated as embodied in a four-stage ring counter with each stage identical to the stages of the binary divider of FIGS. 1 and 3. The cores are initially set so that all but one are at the negative point of remanence —BR while said one core is at positive point of remanence +BR. A trigger pulse will, of course, trigger the one core which is at point +BR toward saturation in the negative direction, thereby triggering one transistor into conduction to complete the switching of the one core while setting the next succeeding core to +BR, all in the exact same manner as described for the binary divider of FIGS. 1 and 3. Thus, the ring counter or pulse commutator of FIG. 5 advances one stage responsive to the receipt of each trigger pulse. It is to be noted that in counters employing more than two stages, the fact that the base circuit of each transistor includes series connected windings on two cores is particularly advantageous in that any noise induced by a trigger pulse when both of the associated cores are in one direction of saturation is canceled since the base windings are poled in opposite directions.

Figure 6:
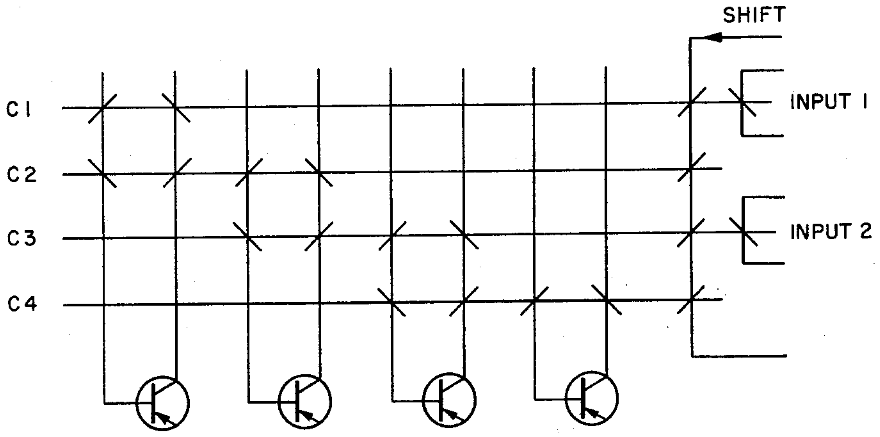
FIG. 6 is a mirror notation representation of a two-core per bit shift register.

A parallel input, two-core per bit shift register constructed in accordance with the principles of the invention is shown in FIG. 6. Either one or both of the cores C1 and C3 can be set to its positive point of remanence +BR by the application of an input pulse to the input circuits input 1 and input 2, respectively. Assuming that both cores C1 and C3 are set by input pulses, the first shift or trigger pulse resets cores C1 and C3 and sets temporary storage cores C2 and C4 in the exact manner as described for the binary divider of FIGS. 1 and 3. The next occurring shift pulse will, of course, reset cores 2 and 4 and set core 3, and, in the same manner, succeeding shift pulses will shift the stored information through the register stages. The circuit shown in FIG. 6 may be modified for series input by alternately applying input pulses to core C1 and shift pulses to all of said cores during the read in operation.

In the tested embodiments of the invention, the cores were of the type S–5F625, the base and trigger windings on each core had five turns, the collector windings on each core had twenty turns, the transistors were type T12N369, resistor 5 had a resistance value of one ohm, and resistors 6 and 7 had resistance values of ten ohms.

Unlike transistor counter circuits, the counter circuits herein disclosed do not produce a steady state output indicative of the condition of the counter in the interval of time between successive trigger pulses. If it is desired to have a continuous indication of the setting of the counter and yet retain the non-volatile characteristics of the disclosed circuits, transfluxer cores may be used with the standard non-destructive read out techniques associated with those cores utilized.

While there has been shown and described what is at present considered to be the preferred embodiments of the invention, modifications thereto will readily occur to those skilled in the art. It is not desired, therefore, that the invention be limited to the embodiments shown and described and it is intended in the appended claims to cover all such modifications as fall within the true spirit and scope of the invention.

What is claimed is:

1. A pulse operated counter comprising a plurality of stages, each of said stages comprising a magnetic core having first and second directions of saturation and a transistor having a base, an emitter, and a collector, means for initially operating said counter to the condition in which the core in one of said stages is saturated in said first direction and the cores in the others of said stages are saturated in said second direction, a winding on each of said cores, means for applying trigger pulses to said windings, said windings being so poled that each trigger pulse triggers the core which is saturated in said first direction toward saturation in said second direction, means for biasing the base and emitter of each transistor in the forward direction to render that transistor conductive when the core in the same stage is triggered toward saturation in said second direction, means including said last named means coupled to the core of said same stage for regeneratively coupling the collector and base of the conducting transistor of said same stage, means for driving the core in each stage toward saturation in said first direction when the transistor in the stage next preceding that stage becomes conductive, and means including said last named means coupled to the core of that stage for regeneratively coupling the collector and base of the conducting transistor in the stage next preceding that stage.

2. A pulse operated counter comprising a plurality of stages, each of said stages comprising a magnetic core having first and second directions of saturation and a transistor having a base, an emitter, and a collector, first, second, third, fourth, and fifth windings on each of said cores, means for connecting the fifth winding on the core in each stage in series with the first winding on the core in the next preceding stage in the base circuit of the transistor in the next preceding stage, means for connecting the third winding on the core in each stage in series with the second winding on the core in the next preceding stage in the collector circuit of the transistor in the next preceding stage, means for initially operating said counter to the condition in which the core in one of said stages is saturated in said first direction and the cores in the others of said stages are saturated in said second direction, means for applying trigger pulses to the fourth windings on said cores, said fourth windings being so poled that each trigger pulse triggers the core which is saturated in said first direction toward saturation in said second direction, said first winding on the core in each stage being poled so as to bias the base and emitter of the transistor in that stage in the forward direction to render that transistor conductive when that core is triggered toward saturation in said second direction, said second winding on the core in each stage being poled so as to aid in driving that core to saturation in said second direction when the transistor in that stage becomes conductive, said third winding on the core in each stage being poled so as to drive that core toward saturation in said first direction when the transistor in the next preceding stage becomes conductive, and said fifth winding on the core in each stage being poled so as to bias the base and emitter of the transistor in the next preceding stage in the forward direction as that core is driven toward saturation in said first direction.

3. In combination, a pulse operated circuit comprising a plurality of stages connected in cascade, each of said stages comprising a magnetic core having first and second directions of saturation and a transistor having a base, an emitter, and a collector, means for initially operating said circuit to the condition in which the core in at least one of said stages but the cores in no two adjacent stages are saturated in said first direction and the cores in the remaining stages are saturated in said second direction, a winding on each of said cores, means for applying trigger pulses to said windings, said windings being so poled that each trigger pulse triggers the cores which are saturated in said first direction toward saturation in said second direction, means for biasing the base and emitter of each transistor in the forward direction to render the transistor conductive when the core in that same stage is triggered toward saturation in said second direction, means including said last named means for regeneratively coupling the collector and base of the conducting transistor of said same stage, means for driving the core in each stage toward saturation in said first direction when the transistor in the stage next preceding that stage becomes conductive, and means including said last named means coupled to the core of that stage for regeneratively coupling the collector and base of the conducting transistor in the stage next preceding that stage.

4. In combination, a pulse operated circuit comprising a plurality of stages connected in cascade, each of said stages comprising a magnetic core having first and second directions of saturation and a transistor having a base, an emitter, and a collector, first, second, third, fourth, and fifth windings on each of said cores, means for connecting the fifth winding on the core in each stage in series with the first winding on the core in the next preceding stage in the base circuit of the transistor in the next preceding stage, means for connecting the third winding on the core in each stage in series with the second winding on the core in the next preceding stage in the collector circuit of the transistor in the next preceding stage, means for initially operating said circuit to the condition in which the core in at least one of said stages but the cores in no two adjacent stages are saturated in said first direction and the cores in the remaining stages are saturated in said second direction, means for applying trigger pulses to the fourth windings on said cores, said fourth windings being so poled that each trigger pulse triggers the cores which are saturated in said first direction toward saturation in said second direction, said first winding on the core in each stage being poled so as to bias the base and emitter of the transistor in that stage in the forward direction to render that transistor conductive when that core is triggered toward saturation in said second direction, said second winding on the core in each stage being poled so as to aid in driving that core toward saturation in said second direction when the transistor in that stage becomes conductive, said third winding on the core in each stage being poled so as to drive that core toward saturation in said first direction when the transistor in the next preceding stage becomes conductive, and said fifth winding on the core in each stage being poled so as to bias the base and emitter of the transistor in the next preceding stage in the forward direction as that core is driven toward saturation in said first direction.

5. A bistable circuit comprising first and second magnetic cores each having first and second directions of saturation, a winding on each of said cores, means for applying trigger pulses to said windings to cause said circuit to alternate between the condition wherein said first core is saturated in said first direction and said second core is saturated in said second direction and the condition wherein said second core is saturated in said first direction and said first core is saturated in said second direction, said windings being poled so that each trigger pulse triggers the one of said first and second cores which is saturated in said first direction toward saturation in said second direction, first and second transistors each having a base, an emitter, and a collector, means for biasing the base and emitter of said first transistor in the forward direction to render said first transistor conductive when said first core is triggered from saturation in said first direction toward saturation in said second direction, means including said last named means coupled to said first core for regeneratively coupling the collector and base of said first transistor, means for driving said second core to saturation in said first direction when said first transistor becomes conductive, means including said last named means coupled to said second core for regeneratively coupling the collector and base of the said first transistor, means for biasing the base and emitter of said second transistor in the forward direction to render said second transistor conductive when said second core is triggered from saturation in said first direction toward saturation in said second direction, means including said last named means coupled to said second core for regeneratively coupling the collector and base of said second transistor, means for driving said first core to saturation in said first direction when said second transistor becomes conductive, and means including said last named means coupled to said first core for regeneratively coupling the collector and base of said second transistor.

6. A bistable circuit comprising first and second magnetic cores each having first and second directions of saturation, first, second, third, and fourth windings on each of said cores, first and second transistors each having a base, an emitter, and a collector, means for connecting the first winding on said first core in the base circuit of said first transistor, means for connecting the second winding on said first core in series with the third winding on said second core in the collector circuit of said first transistor, means for connecting the first winding on said second core in the base circuit of said second transistor, means for connecting the second winding on said second core in series with the third winding on said first core in the collector circuit of said second transistor, means for applying trigger pulses to the fourth windings on said first and second cores to cause said circuit to alternate between the condition wherein said first core is saturated in said first direction and said second core is saturated in said second direction and the condition wherein said second core is saturated in said first direction and said first core is saturated in said second direction, said fourth windings being poled so that each trigger pulse triggers the one of said first and second cores which is saturated in said first direction toward saturation in said second direction, said first winding on said first core being poled so as to bias the base and emitter of said first transistor in the forward direction to render said first transistor conductive as said first core is driven toward saturation in said second direction, said second winding on said first core being poled so as to aid in driving said first core toward saturation in said second direction when said first transistor becomes conductive, said third winding on said second core being poled so as to drive said second core toward saturation in said first direction when said first transistor becomes conductive, said first winding on said second core being poled so as to bias the base and emitter of said second transistor in the forward direction to render said second transistor conductive as said second core is driven toward saturation in said second direction, said second winding on said second core being poled so as to aid in driving said second core toward saturation in said second direction when said second transistor becomes conductive, and said third winding on said first core being poled so as to drive said first core toward saturation in said first direction when said second transistor becomes conductive.

7. A bistable circuit comprising first and second magnetic cores each having first and second directions of saturation, first, second, third, fourth, and fifth windings on each of said cores, first and second transistors each having a base, an emitter, and a collector, means for connecting the first winding on said first core in series with the fifth winding on said second core in the base circuit of said first transistor, means for connecting the second winding on said first core in series with the third winding on said second core in the collector circuit of said first transistor, means for connecting the first winding on said second core in series with the fifth winding on said first core in the base circuit of said second transistor, means for connecting the second winding on said second core in series with the third winding on said first core in the collector circuit of said second transistor, means for applying trigger pulses to the fourth windings on said first and second cores to cause said circuit to alternate between the condition wherein said first core is saturated in said first direction and said second core is saturated in said second direction and the condition wherein said second core is saturated in said first direction and said first core is saturated in said second direction, said fourth windings being poled so that each trigger pulse triggers the one of said first and second cores which is saturated in said first direction toward saturation in said second direction, said first winding on said first core being poled so as to bias the base and emitter of said first transistor in the forward direction to render said first transistor conductive as said first core is driven toward saturation in said second direction, said second winding on said first core being poled so as to aid in driving said first core toward saturation in said second direction when said first transistor becomes conductive, said third winding on said second core being poled so as to drive said second core toward saturation in said first direction when said first transistor becomes conductive, said fifth winding on said second core being poled so as to bias the base and emitter of said first transistor in the forward direction as said second core is driven toward saturation in said first direction, said first winding on said second core being poled so as to bias the base and emitter of said second transistor in the forward direction to render said second transistor conductive as said second core is driven toward saturation in said second direction, said second winding on said second core being poled so as to aid in driving said second core toward saturation in said second direction when said second transistor becomes conductive, said third winding on said first core being poled so as to drive said first core toward saturation in said first direction when said second transistor becomes conductive, and said fifth winding on said first core being poled so as to bias the base and emitter of said second transistor in the forward direction as said first core is driven toward saturation in said first direction.

References Cited in the file of this patent

UNITED STATES PATENTS

| | | |
|---|---|---|
| 2,591,406 | Carter | Apr. 1, 1952 |
| 2,763,780 | Skelton | Sept. 18, 1956 |
| 2,876,438 | Jones | Mar. 3, 1959 |
| 2,939,115 | Bobeck | May 13, 1960 |